United States Patent [19]

Hoskins

[11] Patent Number: 4,760,775
[45] Date of Patent: Aug. 2, 1988

[54] METHOD AND APPARATUS FOR HANDLING SHAPED FOOD PRODUCT

[75] Inventor: Robert W. Hoskins, Jarrettsville, Md.

[73] Assignee: McCormick & Company, Inc., Hunt Valley, Md.

[21] Appl. No.: 13,783

[22] Filed: Feb. 12, 1987

[51] Int. Cl.⁴ .............................................. A47J 37/12
[52] U.S. Cl. ....................................... 99/353; 99/404; 99/427; 198/406; 198/836
[58] Field of Search ............. 99/353, 404, 427, 443 R, 99/443 C, 382, 383; 198/406, 836, 436

[56] References Cited

U.S. PATENT DOCUMENTS

| | | | |
|---|---|---|---|
| 2,603,143 | 7/1952 | Saenz | 99/353 |
| 2,927,680 | 3/1960 | Shappell | 198/560 X |
| 3,136,320 | 6/1964 | Molins et al. | 198/436 X |
| 3,267,836 | 8/1966 | Yepis | 99/404 |
| 3,570,393 | 3/1971 | Schy | 99/404 |
| 3,602,130 | 8/1971 | Perez | 99/404 |
| 3,605,605 | 9/1971 | Sanchez | 99/386 |
| 3,653,337 | 4/1972 | Hanson | 99/426 |
| 3,667,372 | 6/1972 | Hilvitz et al. | 99/404 |
| 3,722,400 | 3/1973 | Jimenez | 99/353 |
| 3,766,846 | 10/1973 | Jimenez | 99/353 |
| 3,785,273 | 1/1974 | Stickle | 99/404 |
| 3,946,655 | 3/1976 | Schy | 99/404 |
| 4,013,162 | 3/1977 | Boer | 198/436 X |
| 4,366,896 | 1/1983 | Tomosue | 198/836 X |
| 4,510,165 | 4/1987 | Caridis et al. | 99/404 X |
| 4,530,275 | 7/1985 | Stickle et al. | 99/353 |
| 4,554,865 | 11/1985 | Caridis et al. | 99/353 |

*Primary Examiner*—John M. Jillions
*Attorney, Agent, or Firm*—Cushman, Darby & Cushman

[57] ABSTRACT

An apparatus for handling shaped food products such as a taco shell at the end of a cooking zone of a cooking apparatus includes a guide ramp for controlling the movement and orientation of the shaped and cooked shell as it is discharged from the cooking zone to a take away conveyor whereby nesting of the shaped shells on the take away conveyor will be made possible by preventing random orienting or falling of the shaped and cooked shell on the take away conveyor.

5 Claims, 3 Drawing Sheets

METHOD AND APPARATUS FOR HANDLING SHAPED FOOD PRODUCT

BACKGROUND AND SUMMARY OF THE INVENTION

The present invention relates to food manufacturing apparatus and, more specifically, to an apparatus for enabling a user to selectively position individually shaped and cooked food products as they are discharged from an automatic cooking machine whereby immediate and subsequent packaging of a desired quantity of the shaped and cooked food products will be made possible with a minimum of manual labor.

In the high capacity production of shaped and fully cooked food products, it has long been desired to be able to automatically mass produce such food products from the raw material batch to a final package with a minimum of contact by food workers to minimize both the labor costs involved and the sanitation steps required to maintain the sanitary integrity of the food product. While a number of different devices have been produced and are available on the market for automatically cooking large batches of individually shaped food products, the final packaging of the food products still remains a labor intensive endeavor in many applications. One of the primary causes of the high labor costs involved in such operations is the requirement for handling a shaped and fully formed food product that is relatively difficult to mechanically automate at a reasonable cost without risking destruction of a large number of the often delicate food items. One such item of particular interest are fried taco shells which are highly popular in many fast food outlets. However, such shaped food products, particularly since they are fried and are constituted by a relatively weak base such as corn starch and/or flour, are relatively fragile thus rendering them particularly susceptible to crushing, cracking or breakage. This can result in a high percentage of rejects in a batch run which can materially increase the costs of the product particularly in view of the increased number of production runs that will be required. To overcome this difficulty, it has previously been necessary to employ workers to visually inspect and glean out defectively formed or substandard food products. In addition, the packaging of such products in a set or variable number per unit package has required further labor expenses since the worker must often individually orient a number of the discrete food items to permit compaction as by nesting into a useful commercial package.

In addition to the increased costs required as a result of sanitary considerations, as noted above, production capacity has also suffered where workers must handle individually cooked food items to facilitate packaging. Specifically, in the case of fried foods, protection from the heated food as it emerges from the cooking zone must be afforded each worker which tends to reduce the production efficiency of such workers. This is a result of either the protection that must be employed in the form of cumbersome gloves or intermediate utensils which enable each worker to handle the extremely hot food items or is a result of the delay required before the food items cool sufficiently to enable manual packaging or orientation for packaging.

It is an object of the present invention to avoid the foregoing difficulties and to provide an apparatus and method for controlling the movement and orientation of individually shaped and cooked food items as they emerge from a cooking zone of a conventional automatic cooking apparatus whereby the individual items will be transferred to a take away conveyor for packaging in a selected orientation on a take away conveyor.

According to the present invention, a conventional cooking apparatus is employed to deliver individually shaped and cooked food items to a discharge station where the guide means of the present invention is located to control the movement and orientation of each individual food item as it is discharged from the cooking zone and which controls the orientation of the individual food items as they are passed to a take away conveyor for packaging.

With the arrangement of the present invention, breakage of individual food items will be greatly minimized by eliminating rough handling of the individually cooked items while maintaining a desired orientation that favors compaction of a plurality of food items for packaging.

The foregoing and other objects of the present invention will become apparent as consideration is given to the following detailed description taken in conjunction with the accompanying drawings, in which:

DETAILED DESCRIPTION OF THE INVENTION

Figure 1:
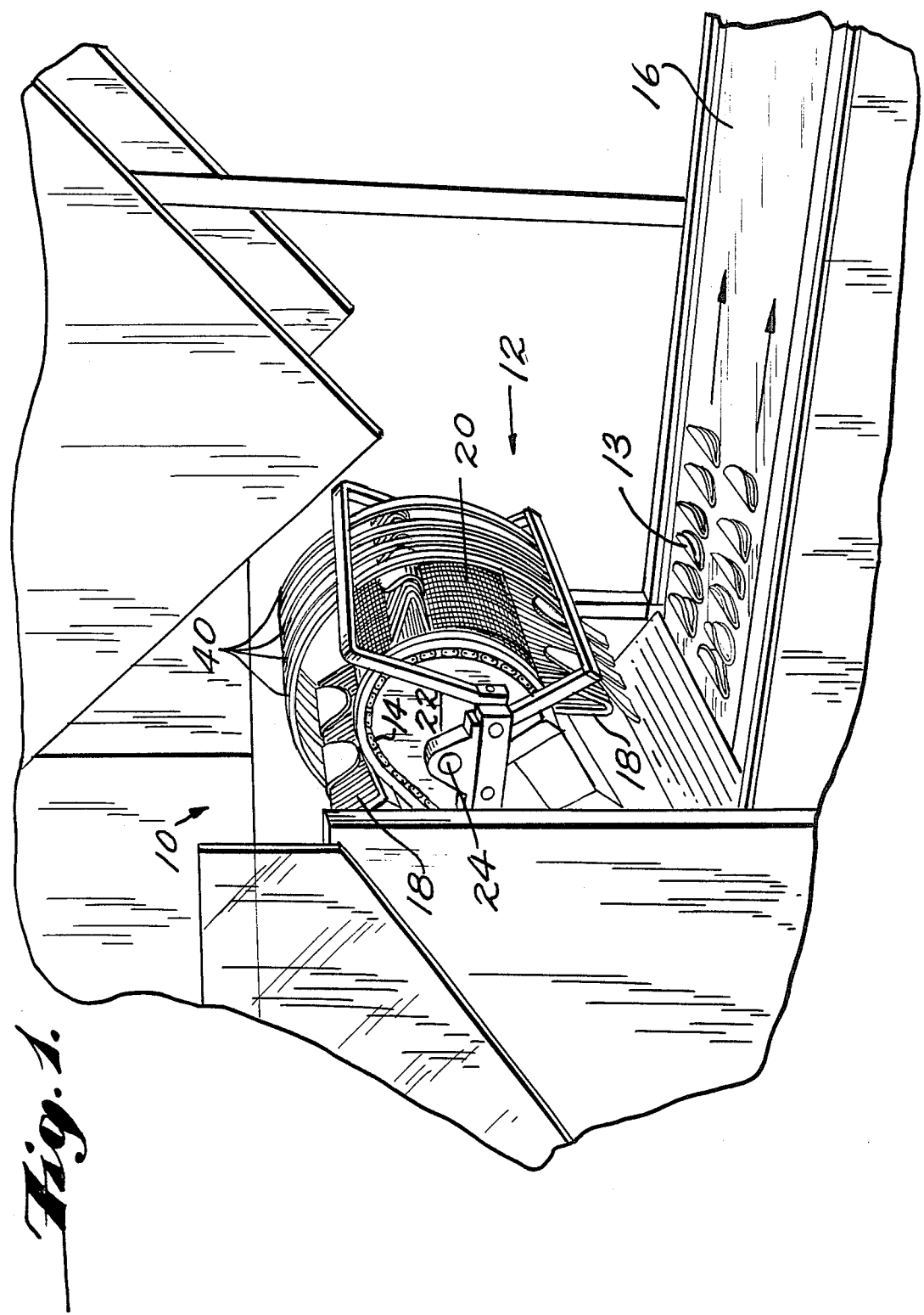
FIG. 1 is a perspective view of the apparatus of the present invention mounted on a conventional food forming and cooking apparatus in conjunction with a take away conveyor.

Referring now to the drawings wherein like numerals designate corresponding parts throughout the several views, there is shown in FIG. 1 a perspective view of a conventional cooking apparatus 10 on the end of which the guide means 12 of the present invention is mounted.

The cooking apparatus 10 is of the type having an endless conveyor 14 preferably made of interwoven stainless steel wire 20 suspended between a pair of endless chains 13, each of which extends over a driven pulley 22 mounted adjacent the discharge end of the cooking apparatus 10.

As is well known, the cooking apparatus 10, which may be of conventional construction, is of a type that receives discrete quantities of preshaped food material such as dough, forms each discrete quantity of material into a desired shape and then conveys the formed shape on a forming surface of a carrying member 18 through a cooking zone, such as a hot oil bath, to cook, as by frying, steaming or the like, the formed food product and then drains and discharges the fully cooked and formed food product at a discharge station such as that illustrated in FIG. 1. The conveyor chains 13 upon turning about the horizontal axis 24 of the pulleys 22 return to the starting position of the cooking apparatus 10.

Figure 3:
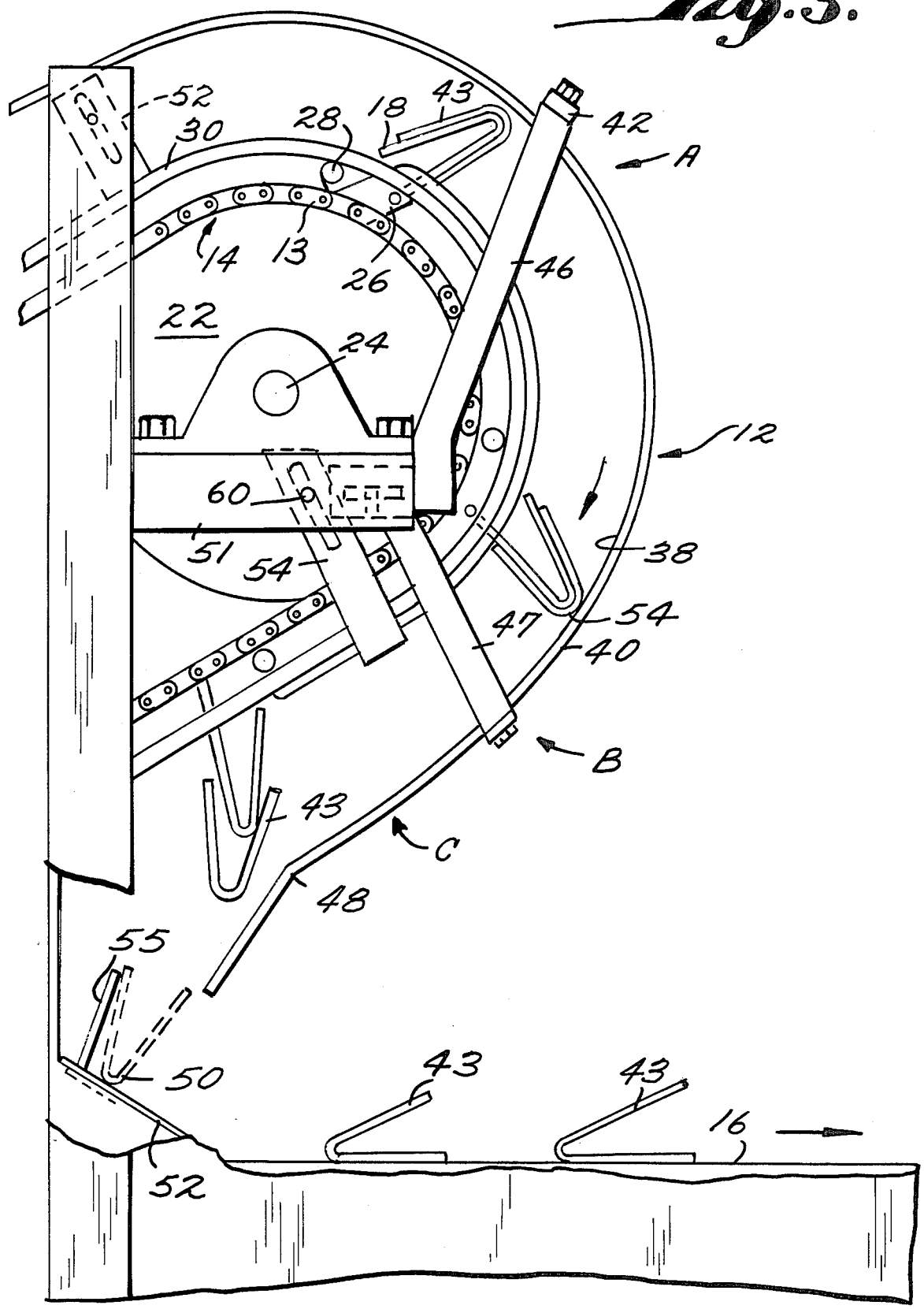
FIG. 3 is a side view of a schematic illustration of the cooperation of the guide means of the present invention with the discharge station of the cooking apparatus of FIGS. 1 and 2.

As shown more clearly in FIG. 3, each food item carrying member 18 is pivotally supported and connected to the chains 13 by a pivotal mount 26 which may be secured at one end by a suitable means to the respective chains 13. The other end 28 of each of the mounts 26 is free to move relative to the chain and is restrained at portions of its travel through the cooking apparatus by guide rods or bars. As shown in FIG. 3, a guide rod in the form of a track 30 is provided radially outwardly of the axis 24 of the pulley 22 to restrain pivoting movement of the mount 26 as the member 18 is carried about the axis 24.

In the conventional operation of the conveyor of the cooking apparatus 10, articles carried on the carrying members 18 would be discharged at the discharge station as the carrying members 18 pass through an angle of 90° from the vertical upon movement of each carrying member past the horizontal axis 24. The individual formed articles would then fall vertically downwardly on to the take away conveyor 16. Due to the random falling and tumbling of the food items, a worker would be required not only to rearrange the food articles on the conveyor 16 prior to packaging, but would also be required to remove food articles that were broken as a result of the discharge from the conveyor 14.

To obviate this difficulty, the present invention provides a guide means 12 mounted about the pulley end of the conveyor 14 of the cooking apparatus 10 to guide and orient the individual food items being discharged to the take away conveyor 16.

Figure 2:
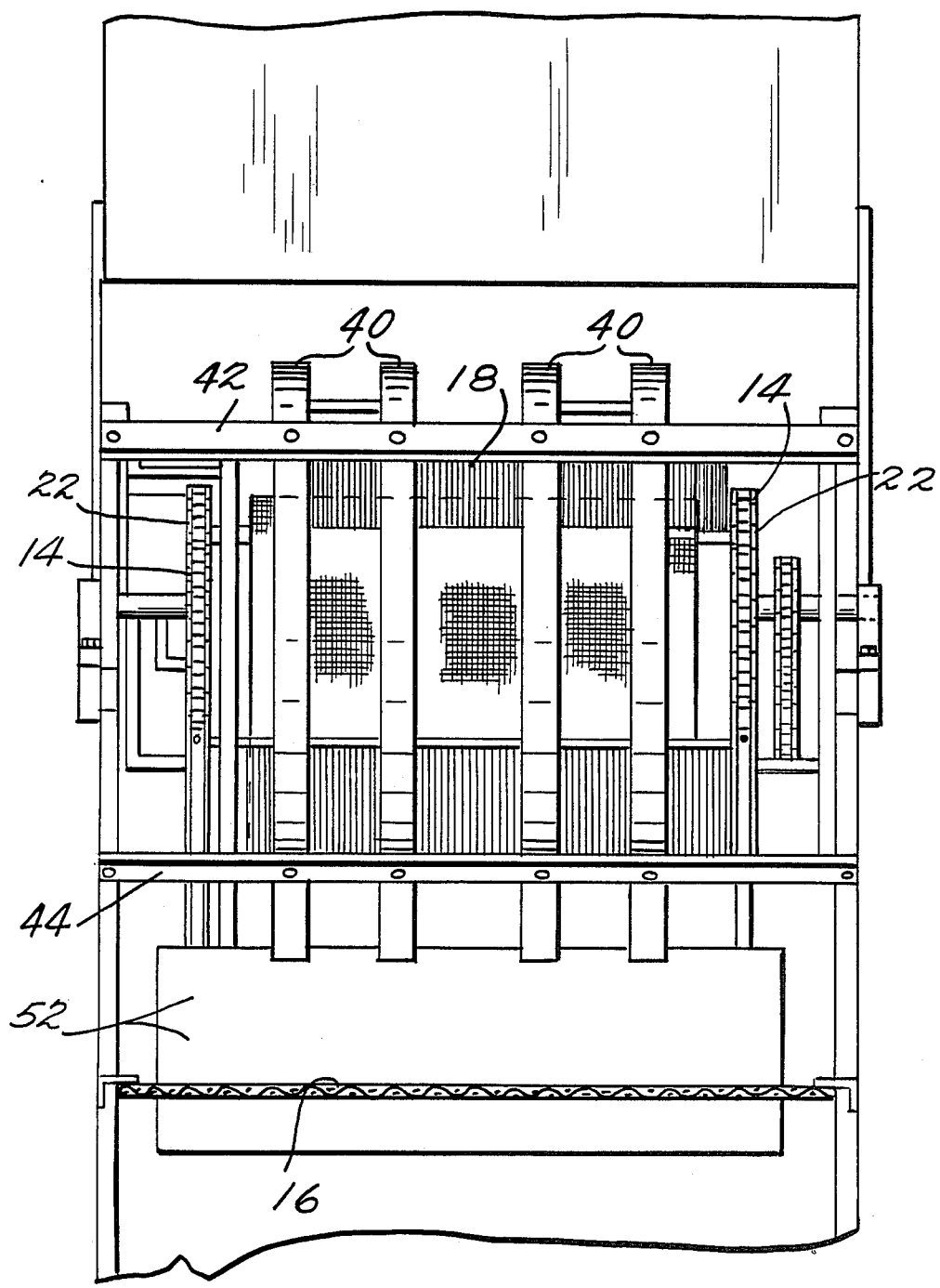
FIG. 2 is an end view in elevation of the apparatus of FIG. 1.

In a preferred embodiment, the guide means 12 will comprise a plurality of guide surfaces, one of which is indicated at 38 and which are defined by the inner surface of a curved metal bar 40. A plurality of bars 40 may be provided to appropriately span the width of the products being treated. In the illustrated embodiment, the cooking apparatus 10 is adapted to carry two food items such as the illustrated taco shells 43 on an individual carrying member 18 at each carrying position which are equally spaced along the conveyor 14. Thus, four guide bars 40 will be employed and arrayed as shown in FIG. 2. This will provide adequate ventilation for the discharge end of the cooking apparatus, minimize surface areas that will have to be cleaned after a production run and yet will assure appropriate contact and guiding and orientation of the descending food products.

As shown in FIGS. 2 and 3, transverse support bars 42, 44 are mounted on the ends of arms 46 and 47, respectively. The individual guide bars 40 are detachably secured as illustrated by threaded bolts to the transverse bars 42 and 44.

With the curvature of the substantially identically formed bars 40 selected so as to enable the positioning of the guide bars 40 just beyond the extent to which the carrying members 18 project radially from the chains 13, movement of the formed food products 43 off of the associated carrying members 18 will be restrained or kept at a minimum to thereby eliminate the possibility of fracturing or breaking of the cooked food products during the traversal of the conveyor about the axis 24 of the pulley 22. The arcuate extent or length of each guide bar 40 will of course be aportioned to the size of the guide members 18 and the radius of the pulley 22. In any event, in the segment of travel of the carrying members 18 below the horizontal axis 24, it is useful that the portion of the guide surface 38 have the proper radial distancing and spacing relative to the ends of the members 18 in this area up to the end points 48 to assure good control at high speed operation. If desired, the supports may be movably connected to the frame 50 although in actual practice, they may be welded to fix the position of the guide surface 38.

As shown in FIG. 3, the guiding action of the guide surface 38 of the guide means 12 is depicted in combination with a diverter means in the form of a guide ramp 52, which is positioned vertically beneath the axis 24 at the discharge station. The ramp 52 is provided with an appropriate and preferably adjustable angle of slope to assure the discharge and movement of the discrete food items such as the shaped and cooked taco shells 43 to the take away conveyor 16. In the illustrated embodiment, continued movement of a guide member 18 from a position A to a position B will effect pivoting of the member 18. The striking of end or cam follower 28 or guide 30 will assist in discharge of a shell and initial release of the food product 43 carried thereby, which movement is restrained by contact of the outer bent portion of the food item 43 as indicated at 54 with the guide surface 38. In some forms of the cooking apparatus 10, the guide members 18 have one edge freely pivoted so that an impact or jarring is imparted to the food product as the guide member 18 passes below the horizontal. This impact results from a striking of the rod 28 on the inner surface of the guide bar 30 as the guide members 18 moves downwardly from position A to position B. At approximately position C, the food product 43 will be resting almost entirely on the guide surface 38 so that upon reaching the end point 48, the fully cooked and shaped food item 43 will drop by gravity a short distance to the sloped surface 52 and move in only one direction, clockwise as illustrated, to the take away conveyor 16. Since each item will be controlled by the same guide means 12 including the ramp 52, and its associated vertical portion 55, each food item will be subjected to a minimum of shock and manipulation and yet each will be oriented with certainty as desired upon reaching the take away conveyor 16. In other applications, it may be possible to eliminate the use of the ramp 52 and its abutment wall 55 by appropriately positioning the take away conveyor 16 vertically beneath the horizontal axis 24 of the pulleys 22. Sufficient space, however, must be left for the formed food articles 43 to move downwardly out of engagement with the carrying members 18 and to rotate clockwise as illustrated in FIG. 3 whereby nesting of a selected quantity of discrete items 43 may be accomplished easily by a worker.

Having described the invention, it will be apparent to those skilled in this art that various modifications may be made thereto without departing from the spirit and scope of this invention as defined in the appended claims.

What is claimed is:

1. Apparatus for handling a food product treated in a cooking apparatus of the type having a conveying means for receiving an uncooked food material and which shapes the material and conveys the shaped material through a cooking zone to a discharge station, the improvement comprising guide means for controlling the movement and orientation of the shaped and cooked food material between said cooking zone and said discharge station, said conveying means including pulley means, the conveying means being disposed to move around said pulley means to return to a starting position, said pulley means having a generally horizontal axis, said discharge station including a conveyor disposed to move in a plane located vertically below said horizontal axis of said pulley means, diverter means disposed between said pulley means and said conveyor adjacent said discharge station, said diverter means being operable to orient each shaped food material moving from said guide means to the conveyor, said conveying means including a plurality of individual food item carrying members, each carrying member having a surface means for imparting a selected shape to a food item at a point prior to entering the cooking zone and to maintain the selected shape as said conveying means moves about said pulley means, said conveying means being an endless conveyor with said carrying members spaced generally equally apart from one another along said endless conveyor, said surface means of each carrying member being employed to move a carried food item while a said respective carrying member is disposed upstream of said pulley means but being effective to release, under the influence of gravity, the respective food item upon movement of the respective carrying member about said pulley means through an angle greater than approximately 90°, said guide means comprising a guide surface extending about said pulley means and having an end point and being spaced radially outwardly from said horizontal axis a predetermined radial distance corresponding to a perpendicular extent determined by the extent to which said carrying members extend from said endless conveyor so that, as said carrying members move through an angle greater than 90° about said pulley means, an individual food item carried by a said respective carrying member will be permitted to at least partially disengage from said carrying member to engage at least a portion of said guide means until said carrying member passes said end point of said guide means whereupon said respective food item will pass under the influence of gravity downwardly to engage said diverter means disposed substantially vertically beneath said end point of said guide means, said diverter means being effective to orient said respective food item prior to passage of said respective food item to said conveyor adjacent said discharge station.

2. The apparatus as claimed in claim 1, wherein said guide means include a plurality of individual guide surfaces with each spaced apart along said horizontal axis of said pulley means to facilitate ventilation therebetween.

3. The apparatus as claimed in claim 1, further including means for adjustably positioning said guide surface relative to said horizontal axis of said pulley means.

4. The apparatus as claimed in claim 1, wherein said guide surface comprises an arcuately curved metal bar member.

5. The apparatus as claimed in claim 2, wherein said guide surfaces are a plurality of arcuately curved metal bar members.

* * * * *